(12) United States Patent
Kalhan (10) Patent No.: US 9,531,457 B2
(45) Date of Patent: Dec. 27, 2016

(54) INTERFERENCE MANAGEMENT OF DEVICE-TO-DEVICE COMMUNICATION IN A CELLULAR COMMUNICATION SYSTEM

(71) Applicant: Kyocera Corporation, Kyoto (JP)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 27 days.

(21) Appl. No.: 14/414,968

(22) PCT Filed: Jul. 18, 2013

(86) PCT No.: PCT/US2013/051003
§ 371 (c)(1),
(2) Date: Jan. 15, 2015

(87) PCT Pub. No.: WO2014/015101
PCT Pub. Date: Jan. 23, 2014

(65) Prior Publication Data
US 2015/0171944 A1 Jun. 18, 2015

Related U.S. Application Data

(60) Provisional application No. 61/673,000, filed on Jul. 18, 2012.

(51) Int. Cl.
*H04B 7/04* (2006.01)
*H04W 72/08* (2009.01)
(Continued)

(52) U.S. Cl.
CPC .......... *H04B 7/0456* (2013.01); *H04B 7/0413* (2013.01); *H04L 25/03904* (2013.01);
(Continued)

(58) Field of Classification Search
None
See application file for complete search history.

(56) References Cited

U.S. PATENT DOCUMENTS

2006/0229092 A1 10/2006 Jia et al.
2009/0110038 A1 4/2009 Montojo et al.
(Continued)

FOREIGN PATENT DOCUMENTS

WO  WO 2010/082084  7/2010
WO  WO 2010/082114  7/2010
(Continued)

OTHER PUBLICATIONS

Doppler et al; "Device-to-Device Communication as an Underlay to LTE-Advanced Networks", IEEE Communications Magazine; Dec. 1, 2009; IEEE Service Center; Piscaway, US.

*Primary Examiner* — Duc Duong (57) ABSTRACT

In a cellular communication system, pre-coding MIMO parameters are assigned for transmission of device-to-device (D2D) signals between D2D mobile devices to minimize interference at unintended recipient devices (receiving proximate devices). The pre-coding MIMO parameters are transmitted from a base station to a transmitting D2D mobile device over a subset of defined downlink cellular communication resources defined by a communication specification for downlink transmission from base stations to mobile wireless devices. The pre-coding MIMO parameters are determined based on channel characteristics of at least an Interference channel where the Interference channel is between a D2D transmitting device and a proximate receiving mobile device (unintended recipient device). The pre-coding MIMO parameters are determined to facilitate interference management at the receiving proximate mobile device when the pre-coded transmission signal is received through the interference channel.

15 Claims, 7 Drawing Sheets

(51) Int. Cl.
    *H04W 40/16*    (2009.01)
    *H04L 25/03*    (2006.01)
    *H04W 8/00*     (2009.01)
    *H04W 4/02*     (2009.01)
    *H04W 72/04*    (2009.01)
    *H04W 76/02*    (2009.01)
    *H04W 4/00*     (2009.01)

(52) U.S. Cl.
    CPC ............ *H04W 4/023* (2013.01); *H04W 8/005* (2013.01); *H04W 72/042* (2013.01); *H04W 72/0413* (2013.01); *H04W 72/082* (2013.01); *H04W 76/023* (2013.01); *H04B 7/0404* (2013.01); *H04W 4/008* (2013.01)

(56) References Cited

U.S. PATENT DOCUMENTS

| | | | |
|---|---|---|---|
| 2010/0261469 A1* | 10/2010 | Ribeiro | H04W 99/00 455/423 |
| 2011/0275382 A1 | 11/2011 | Hakola et al. | |
| 2012/0099540 A1* | 4/2012 | Doppler | H04J 11/0033 370/329 |
| 2013/0029713 A1* | 1/2013 | Jang | H04W 24/10 455/517 |
| 2013/0195026 A1* | 8/2013 | Johnsson | H04W 72/085 370/329 |
| 2014/0127991 A1* | 5/2014 | Lim | H04W 76/023 455/39 |
| 2014/0315562 A1* | 10/2014 | Lim | H04W 76/023 455/450 |
| 2015/0110020 A1* | 4/2015 | Li | H04B 7/0617 370/329 |

FOREIGN PATENT DOCUMENTS

| | | |
|---|---|---|
| WO | WO 2011/069295 | 6/2011 |
| WO | WO 2011/109941 | 9/2011 |
| WO | WO 2013/074462 | 5/2013 |
| WO | WO 2013/074463 | 5/2013 |

* cited by examiner

INTERFERENCE MANAGEMENT OF DEVICE-TO-DEVICE COMMUNICATION IN A CELLULAR COMMUNICATION SYSTEM

CLAIM OF PRIORITY

The present application claims priority to Provisional Application No. 61/673,000 entitled "Network Assisted D2D Communications Using Interference Coordination," filed Jul. 18, 2012, assigned to the assignee hereof and hereby expressly incorporated by reference in its entirety.

FIELD

This invention generally relates to wireless communications and more particularly to interference management of device-to-device (D2D) communication in a cellular communication system.

BACKGROUND

Many wireless communication systems use base stations to provide geographical service areas where wireless communication user equipment (UE) devices communicate with the base station providing the particular geographical service area in which the wireless communication UE devices are located. The base stations are connected within a network allowing communication links to be made between the wireless communication devices and other devices. In some circumstances, the communication links are between wireless communication devices (UEs) that are close to each other. In these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

In a cellular communication system, pre-coding Multiple Input Multiple Output (MIMO) parameters are assigned for transmission of device-to-device (D2D) signals between D2D mobile devices to minimize interference at unintended recipient devices (receiving proximate devices). The pre-coding MIMO parameters are transmitted from a base station to a transmitting D2D mobile device over a subset of defined downlink cellular communication resources defined by a communication specification for downlink transmission from base stations to mobile wireless devices. The pre-coding MIMO parameters are determined based on channel characteristics of at least an interference channel where the interference channel is between a D2D transmitting device and a proximate receiving mobile device (unintended recipient device). The pre-coding MIMO parameters may be determined based on other channel characteristics of other channels. The pre-coding MIMO parameters are determined to facilitate interference management at the receiving proximate mobile device when the pre-coded transmission signal is received through the interference channel. The channel parameters indicative of the channel characteristics are received over a subset of defined uplink cellular communication resources defined by the communication specification for uplink transmission to base stations. The interference management may include any one of, or combination of, interference rejection, interference shaping, interference avoidance, and interference containment.

DETAILED DESCRIPTION

Cellular communication systems include several base stations that provide wireless service to mobile wireless devices. For the examples discussed herein, the communication system supports device-to-device (D2D) communication between mobile wireless devices. Mobile wireless devices engaged in D2D communication, referred to as D2D mobile devices, pre-code D2D signals to facilitate interference management to reduce, eliminate or avoid inference using techniques such as interference cancellation, interference shaping (interference alignment), interference avoidance, and/or interference rejection. As described below in further detail, a controller determines pre-coding MIMO parameters based on channel characteristics and sends the pre-coding MIMO parameters to one or more D2D mobile devices using downlink cellular communication resources defined by a communication specification. Although in some circumstances the controller may be implemented as part of a mobile wireless device or other entity, the controller is maintained in the core network for the examples herein. When applied to a D2D signal to be transmitted, the pre-coding MIMO parameters adjust the amplitude and phase components of each component signal at each antenna element of a multiple element antenna to manipulate the characteristics of the transmitted signal. As the signal travels through the wireless channel, the wireless channel changes the signal characteristics. Accordingly, the pre-coding MIMO parameters are determined based on the channel characteristics to achieve particular signal characteristics of the signal after transmission through the channel.

The communication system utilizes cellular communication resources for communication between base stations (eNodeBs, eNBs) and wireless communication user equipment devices (UEs). The cellular communication resources include downlink communication resources for downlink communication from a base station to wireless communication user equipment (UE) devices and uplink communication resources for uplink transmissions from the UE devices to the base station. The uplink communication resources are different from the downlink communication resources. Some of the cellular communication resources are assigned to device-to-device (D2D) communication between two UE devices as needed. The downlink communication resources assigned for D2D communication are not used for downlink communication. For example, if the communication resources are time-frequency communication resources, the time segments and frequency bands (e.g., sub-carriers) assigned to the D2D communication link are not used by the base station. If uplink communication resources are assigned for D2D communication, the resources are assigned such that interference to other D2D communication and to uplink communication in adjacent cells, as well as the same cell, is minimized. Examples of suitable techniques for managing cellular resources for D2D communication are discussed in Patent Application Serial Number PCT/US2012/064711, entitled "DEVICE TO DEVICE COMMUNICATION MANAGEMENT USING CELLULAR COMMUNICATION RESOURCES," filed on Nov. 12, 2012, and incorporated by reference in its entirety herein.

In the examples discussed herein, a base station uses cellular communication resources to exchange information with wireless communication devices to establish the pre-coding MIMO parameters that are to be applied for device-to-device (D2D) transmissions between mobile wireless devices. The cellular communication resources are defined by a communication specification for communication between wireless communication devices (UEs) and base stations (eNBs). The pre-coding MIMO parameters are based on channel characteristics of wireless transmission channels between communicating D2D devices and channel characteristics of wireless interference channels between transmitting 02D devices and other unintended recipient mobile devices such as other D2D devices. The channel characteristics are determined by D2D mobile devices that evaluate reference signals transmitted by other D2D devices over the channels to be evaluated. Channel parameters indicative of the channel characteristics are transmitted to the controller using uplink cellular communication resources defined by the communication specification for uplink communication.

The examples discussed below are implemented within a cellular communication system including base stations and mobile wireless devices where the system supports device-to-device (D2D) communication between mobile wireless devices. Interference management is achieved by applying pre-coding MIMO parameters at D2D transmitting devices to D2D transmissions. As discussed in further detail below, the cellular communication resources defined by a communication specification for communication between base stations and mobile wireless devices are used to transmit pre-coding MIMO parameters to D2D devices and to receive channel parameters from D2D devices.

Figure 1A:
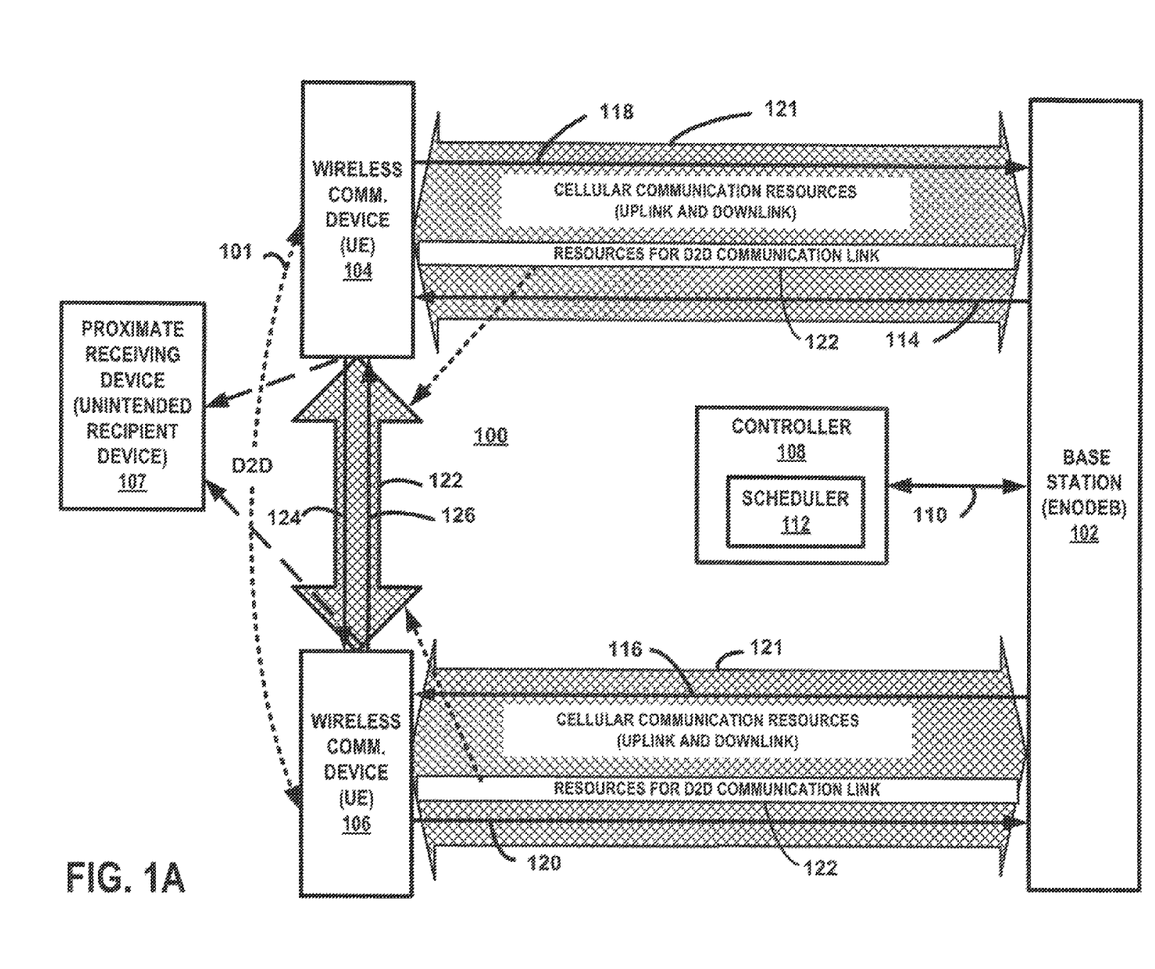
FIG. 1A is a block diagram of an example of a communication system where cellular communication resources are used for interference management of device-to-device (D2D) communications between wireless communication devices.
Figure 1B:
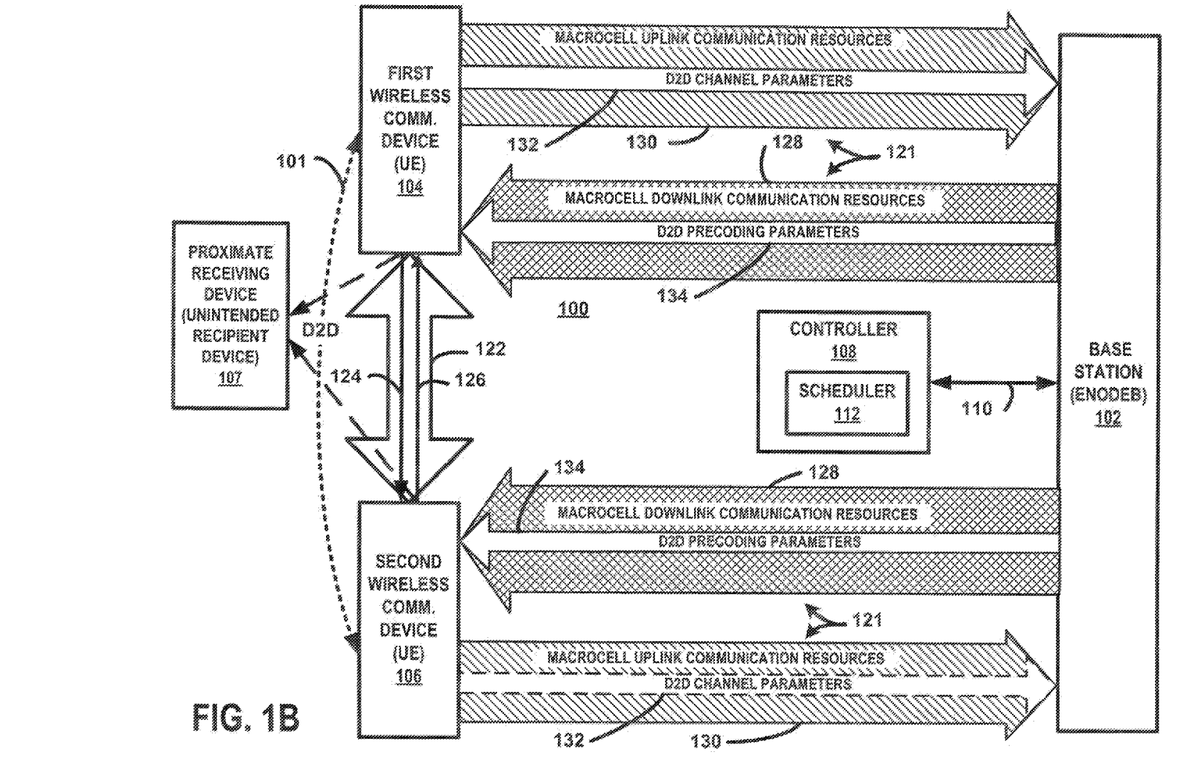
FIG. 1B is a block diagram of an example of the resources used in the communication system of FIG. 1A to manage interference.

FIG. 1A and FIG. 1B are block diagrams of an example of a cellular communication system 100 where cellular communication resources are used for communication with wireless communication devices to establish a device-to-device (D2D) communication link 101 between wireless communication devices that facilitates interference management. A relationship between cellular communication resources and the D2D communication link is shown in FIG. 1A. The resources for establishing the D2D communication link and for transmitting pre-coding MIMO parameters and channel parameters are shown in FIG. 1B. A base station 102 provides wireless communication services to wireless communication user equipment (UE) devices 104, 106, 107 within a geographical service area, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device, and the functions described as performed in any single device may be implemented over several devices. For example, at least some of the functions of the controller 108 may be performed by the wireless communication devices 104, 106 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification. In the interest of clarity, the communication resources used for communication between the base station 102 and the proximate receiving device 107 are omitted in FIG. 1A and FIG. 1B.

The base station 102 is a fixed transceiver station, sometimes referred to as an eNodeB or eNB, which may include a controller in some circumstances. The base station 102 is connected to a controller 108 through a backhaul 110 which may include any combination of wired, optical, and/or wireless communication channels. For the examples herein, the controller 108 includes the functionality of the Mobility Management Entity (MME) and the Packet Gateway (P-GW) in a 3GPP LTE communication system. Accordingly, the controller 108 includes a scheduler 112. In the example, the scheduler 112 allocates time-frequency resources for D2D communication between the wireless communication devices 104, 106 and for cellular communication between the base station 102 and the wireless communication devices 104, 106.

The wireless (UE) communication devices 104, 106, 107 may be referred to as mobile devices, wireless devices, wireless communication devices, and mobile wireless devices, UEs, UE devices as well as by other terms. The wireless communication UE devices 104, 106, 107 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, or television.

The base station 102 includes a wireless transceiver that exchanges wireless signals 114, 116, 118, 120 with the wireless communication devices 104, 106, 107. Transmissions from the base stations and from the wireless communication devices 104, 106, 107 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from base stations to wireless communication devices.

The cellular communication resources 121 are used for transmitting the downlink signals 114, 116 and the uplink signals 118, 120. The base station 102 transmits downlink signals 114, 116 to the wireless communication devices 104, 106 using scheduled downlink communication resources of the defined downlink communication resources defined by the communication specification and reserved for downlink communication. The wireless communication devices transmit uplink signals 118, 120 to the base station using scheduled uplink communication resources of the defined uplink communication resources defined by the communication specification and reserved for uplink communication. The cellular communication resources 121 include frequency bands divided in time where each frequency band and segment of time can be identified by the scheduler 112 and described in control signals sent from the base station 102 to the wireless communication devices 104, 106, 107. The communication specifications, or other system rules, therefore, define applicable communication resources for the downlink and applicable communication resources for the uplink. The scheduler 112 allocates different time-frequency resources to different devices to efficiently utilize the resources while minimizing interference. Accordingly, the scheduled cellular communication resources used for signals 114, 118 exchanged with one wireless communication device 104 are different from scheduled cellular communication resources used for other signals 116, 120 exchanged with other wireless communication devices 106. As referred to herein, therefore, the cellular communication resources 121 are the communication resources reserved for communication by the specification and/or communication system rules. The scheduled resources for transmission for particular signals, however, are a subset of the reserved cellular communication resources 121.

Some of the defined cellular communication resources are assigned (scheduled) for D2D communication. This portion (122) of defined cellular communication resources 121, referred to as D2D communication resources 122, is typically scheduled dynamically as needed and based on channel conditions as well as other criteria. The scheduler 112, therefore, may assign either defined cellular downlink communication resources, defined cellular uplink communication resources, or both for D2D communication.

In certain situations, it may be desirable for a wireless communication device to communicate directly over a D2D communication link instead of through base stations. During D2D communication, the first wireless communication device 104 transmits first D2D signals 124 to the second wireless communication device 106, and the second wireless communication device 106 transmits second D2D signals 126 to the first wireless communication device 104. In some situations, the D2D transmission may only be in one direction. For example, a D2D link may be established from a laptop to a display where only the laptop transmits signals to the display for broadcasting, streaming and other purposes.

For efficient D2D communications, the wireless communication devices typically must be close to each other. Since many wireless communication devices are mobile, the distance between any two devices changes. As a result, either the network or one of the wireless communication devices must determine that the wireless communication devices are sufficiently close for D2D communication. In the examples herein, a wireless communication device detects another nearby wireless communication device by receiving reference signals transmitted by the other wireless communication device. After detection, the wireless communication device may attempt to initiate a D2D communication link 101 as discussed in further detail below.

The scheduler 112 allocates time-frequency resources for communication between the base station 102 and the wireless communication devices 104, 106. In addition, the controller 108, scheduler 112, and/or the base station 102 schedules sounding reference signals (SRS) on the uplink. In the examples discussed herein, the scheduler 112 also allocates (schedules) time-frequency resources for transmission of D2D SRS from the wireless communication UE devices 104, 106 to establish and/or maintain the device-to-device (D2D) communication link 101. The D2D SRS transmissions are used for device detection/discovery, signal acquisition (reception), channel estimation, and determining channel characteristics and CSI. Examples of techniques of transmitting D2D reference signals are described in PCT patent application serial number PCT/US2012/64712, titled "TRANSMISSION OF DEVICE TO DEVICE SOUNDING REFERENCE SIGNALS USING MACROCELL COMMUNICATION RESOURCES", filed on Nov. 12, 2012, and incorporated by reference in its entirety herein. In the examples herein, therefore, wireless communication devices detect/discover other wireless communication devices in their vicinity by transmitting and receiving D2D SRS signals.

As discussed above, when one wireless communication device is aware of another wireless communication device and intends to communicate with the other wireless communication device, it may be more efficient to communicate through a D2D communication link instead of through the network. In order to avoid interference, the communication resources used for the D2D communication link 101 must be assigned or scheduled. Although it may be possible for the wireless communication devices to track and assign communication resources autonomously, a more centralized controller within the network can more easily manage the scheduling, reducing processing at the wireless communication devices.

The proximate receiving device 107 is an unintended recipient of signals (124, 126) transmitted from one of both of the wireless communication devices 104, 106. The proximate receiving device 107 may be in wireless communication with the base station 102, and/or another wireless communication device (not shown). The proximate receiving device is receiving other signals from one or more devices within the same time-frequency resources at which the transmitting D2D device is transmitting signals 124.

Since the proximate receiving device is sufficiently close to at least one of the wireless communication devices, at least some of the transmitted signals 124, 126 are potentially interference to the proximate receiving device 107. As discussed below, interference management is used to mitigate, avoid, or eliminate interference at the proximate receiving device 107 due to the signals 124, 126 by MIMO pre-coding the D2D signals 124, 126.

Referring now to FIG. 1B, the communication system 100 utilizes downlink communication resources 128 for downlink communication from a base station to wireless communication user equipment (UE) devices and utilizes uplink communication resources 130 for uplink transmissions from the UE devices to the base station. The uplink communication resources are different from the downlink communication resources. Depending on the particular implementation, some of the downlink communication resources 128, some of the uplink communication resources 130, or some of both are assigned for device-to-device (D2D) transmission from UE devices as needed. Accordingly, the D2D signals 124, 126 may use downlink communication resources 128 or uplink communication resources 130 assigned by the scheduler 112. The communication resources 122 assigned for D2D communication are not used for downlink communication. For example, if the communication resources are time-frequency communication resources, the time segments and frequency bands assigned for D2D transmission are not used by the base station to serve non-D2D UE devices. If uplink communication resources are assigned for D2D communication, the scheduling of those resources to other devices is managed to minimize interference.

The UE devices transmit the D2D signals 124, 126 using the assigned communication resources 122. As discussed herein, defined downlink communication resources are communication resources defined by a communication specification as the communication resources reserved for downlink communication from a base station to wireless communication devices. Scheduled downlink communication resources are a subset of the defined downlink communication resources that have been assigned (scheduled) for downlink communication between a base station and a wireless communication device, and D2D communication resources 122 are a subset of the defined downlink communication resources that have been assigned (scheduled) for D2D transmission from wireless communication devices if downlink communication resources are used for D2D communication.

Also as discussed herein, defined uplink communication resources are communication resources defined by a communication specification as the communication resources reserved for uplink communication from a wireless communication devices to base stations. Scheduled uplink communication resources are a subset of the defined uplink communication resources that have been assigned (scheduled) for uplink communication between a wireless communication device and a base station, and D2D communication resources 122 are a subset of the defined uplink communication resources that have been assigned (scheduled) for D2D transmission from wireless communication devices if uplink resources are used for D2D communication. Therefore, the defined cellular communication resources 121 include defined cellular downlink communication resources 128 and defined cellular uplink communication resources 130 where a subset of one or both of the defined resources are assigned for D2D communication.

The communication network manages D2D communication links by receiving and transmitting information over cellular communication resources. In accordance with the examples discussed herein, wireless communication devices transmit D2D link information to base stations using cellular uplink communication resources and base stations transmit D2D link establishment messages to the wireless communication devices using cellular downlink communication resources. A D2D call/session can be initiated by a wireless communication device by sending a D2D call initiation message using cellular uplink communication resources. Examples of techniques for establishing D2D communication links are discussed in PCT Patent Application Serial Number PCT/US13/40584, titled "MANAGEMENT OF DEVICE-TO-DEVICE COMMUNICATION RESOURCES USING MACROCELL COMMUNICATION RESOURCES" filed on May 10, 2013 and incorporated by reference in its entirety herein. As part of, or in addition to, the D2D management communications described in the related application, channel parameters are transmitted from the mobile wireless devices to the base station and pre-coding MIMO parameters are transmitted from the base station to the mobile wireless devices using the cellular downlink communication resources 130.

The channel parameters are transmitted using a subset 132 of the defined uplink cellular communication resources 130. The D2D pre-coding MIMO parameters are transmitted using a subset 134 of the defined downlink cellular communication resources 128. For the examples herein, the pre-coding MIMO parameters are transmitted over a Physical Downlink Control Channel (PDCCH) and/or Physical Downlink Shared Channel (PDSCH) in accordance with current LTE standards. IN one example, a new D2D message is delivered on PDSCH or PDCCH where a DCI format indicates a D2D format type with pre-coding MIMO parameters, D2D resource allocation, and other D2D information. An example of a suitable technique for transmitting the pre-coding MIMO parameters in the PDCCH includes sending the parameters within a Common Search Space. In some situations, the pre-coding MIMO parameters are sent in a UE-Specific Search Space. Using the broadcasting technique of a common search space may minimize signaling to the participating mobile wireless devices. For the examples, the channel parameters are transmitted from the mobile wireless devices to the base station using a Physical Uplink Control Channel (PUCCH) and/or PUSCH in accordance with current LTE standards except that a portion of the PUCCH is allocated for the D2D channel parameters. Uplink data channels may also be sued in some circumstances.

The D2D channel parameters are indicative of channel characteristics of the D2D channels. The channel parameters are determined by a mobile wireless device by measuring reference signals transmitted by another device through the channel to be measured. The mobile wireless device measuring the reference signals is not necessarily the mobile wireless device that transmits the channel parameters to the base station in the uplink channel. For example, one mobile wireless device may measure a reference signal transmitted by another mobile wireless device and then report the measurements to the other device. The other device may then report the channel parameters of the D2D channel to the base station. Also, due to channel symmetry, channel parameters for a channel D2D channel between two D2D devices may be determined by either one of D2D devices for transmission through the channel in either direction. In FIG. 1B, the arrow representing the channel parameter channel 132 from the second wireless communication device 106 is illustrated with dashed lines to indicate that the channel parameters are not transmitted by the second device in some circumstances. As discussed below and depending on the type of interference management technique that is used, however, the second wireless communication device may report channel parameters for interference channels between the second wireless communication device and other transmitting devices.

The channel parameters may have any of various formats depending on the particular implementation. For example, the channel parameters may include directly measured values, parameters calculated or otherwise derived from measured values, or other indicators conveying the characteristics of the channel. One technique includes providing index from a codebook that represents the channel state. The codebook for D2D channel parameters is different from a codebook used for providing cellular channel parameters for channel characteristics between base stations and mobile wireless devices.

As discussed below, the D2D pre-coding MIMO parameters are parameters applied by the D2D transmitting device to D2D signals that result in a particular amplitude and phase at each antenna element of a multiple element antenna for transmitted signals. The pre-coding MIMO parameters, or other values derived from the pre-coding MIMO parameters, may be applied at any of several positions along the transmitter chain to achieve the desired phase/amplitude arrangement between the antenna elements. The channel characteristic of each channel through which the pre-coded transmitted signals travel influence the characteristics of the signal as received at a receiving device. The pre-coding MIMO parameters, therefore, are selected such that the pre-coded signal has desired characteristics at a proximate receiving device (unintended receiving device) 107 after traveling through the interference channel between the transmitting device and the proximate receiving device. Accordingly, the pre-coding MIMO parameters are determined at least based on the channel characteristics of the interference channel between the transmitting device 104 and the proximate receiving device 107. As discussed below, channel parameters of other channels, such as the channel between the transmitting device and an intended receiving device 106, may also be taken into consideration when determining the pre-coding MIMO parameters.

For the examples, the pre-coding MIMO parameters are determined by the scheduler 112 in the controller 108. The scheduler 112 may be at least partially implemented within the base station or may be a separate entity. The scheduler evaluates the channel parameters received from one or more wireless communication devices 104, 106 and 107 and determines the pre-coding MIMO parameters. The pre-coding MIMO parameters are transmitted to the transmitting mobile device using cellular downlink communication resources such as the PDCCH. The PDCCH is a defined cellular downlink channel that uses a subset of defined cellular downlink communication resources.

Figure 2:
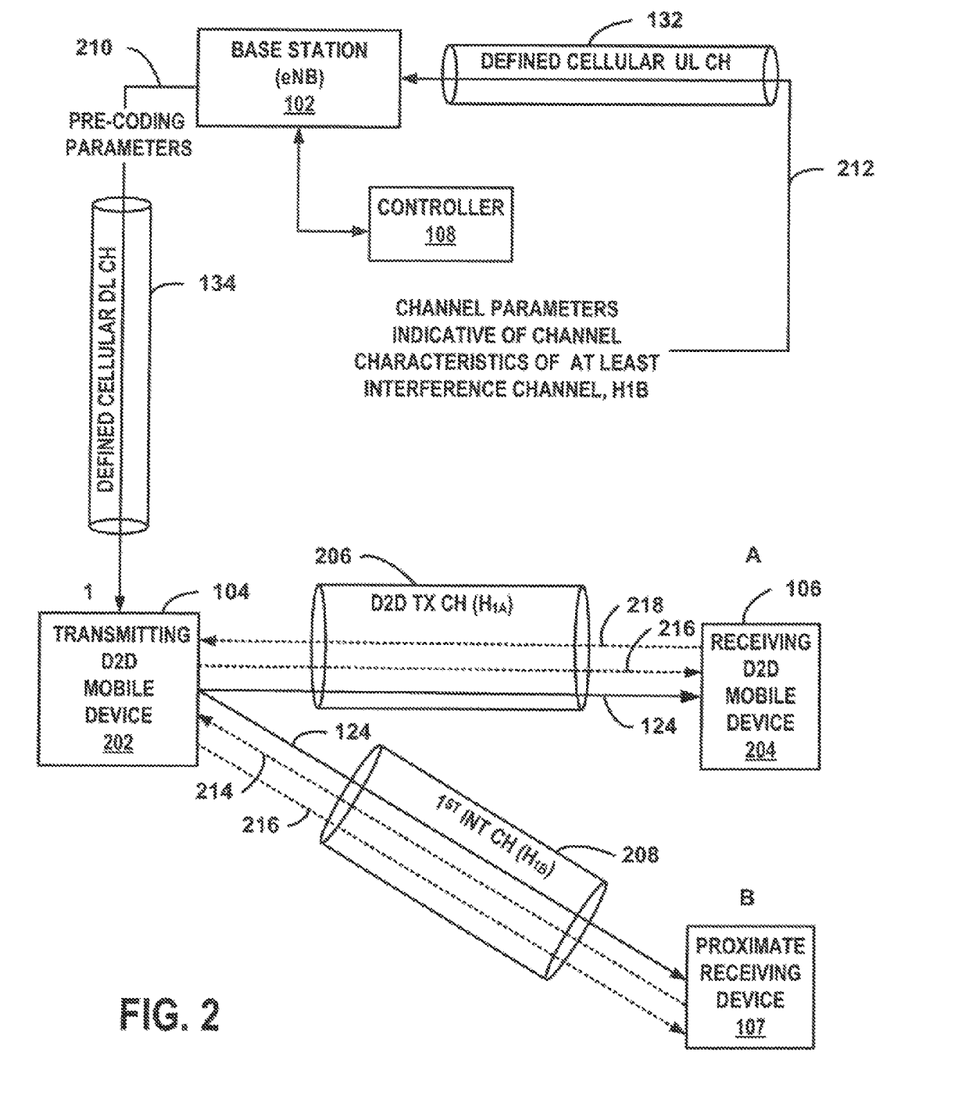
FIG. 2 is a block diagram of the communication system including a transmitting D2D mobile device, a receiving D2D mobile device, and a proximate receiving device.

FIG. 2 is a block diagram of the communication system 100 including a transmitting D2D mobile device 202, a receiving D2D mobile device 204 and a proximate receiving device 206. The transmitting D2D mobile device 202, the receiving D2D mobile device 204 and the proximate receiving device 107 are examples of the wireless communication devices 104, 106, 107 discussed with reference to FIG. 1A and FIG. 1B where the first wireless communication device 104 is the transmitting D2D mobile device 202 and the second wireless communication device 106 is the receiving D2D mobile device 204. The transmitting D2D mobile 202 device transmits a D2D transmission signal 124 to the receiving D2D mobile device 204 through a D2D transmission channel ($H_{1A}$) 206 using a D2D communication resources 122. As discussed above, the D2D communication resources 122 are subset of defined cellular communication resources 121. The transmission signal 124 is also received at the proximate receiving device through a first interference channel ($H_{1B}$) 208 between the transmitting D2D device 202 and the proximate receiving device (unintended recipient device) 107. The D2D transmission signal 124 is pre-coded in accordance with the pre-coding MIMO parameters 210. The pre-coding MIMO parameters 210 are determined by the controller 108 and transmitted by the base station 102 to through the defined cellular downlink channel 134 which uses defined cellular downlink communication resources. The transmitting D2D mobile device 202 applies the pre-coding MIMO parameters 210 to the D2D transmission signal 124. The pre-coding MIMO parameters 210 are determined based on the channel characteristics of at least the first interference channel 208, $H_{1B}$. Depending on the particular type of interference management technique employed in the system, the pre-coding MIMO parameters 210 may be based on channel characteristics of other channels and/or other data. An example of a suitable technique for applying pre-coding MIMO parameters includes using a MIMO precoding matrix.

The channel characteristics are determined by measuring reference signals transmitted through the channel. As mentioned above, examples of techniques of transmitting D2D reference signals are described in PCT patent application serial number PCT/US2012/64712. The channel characteristics are provided to the base station 102 and controller 108 by transmitting channel parameters 212 indicative of the channel characteristics to the base station 102 through a defined cellular uplink channel 132. For the examples herein, the channel parameters include at least an interference received power level and the spatial characteristics of the received signal to facilitate the spatial-based interference management. In circumstances where the channel measuring device is reporting whether a frequency-time resource is available for use, the measuring mobile device measures and reports the interference level (received power) of the reference signal. Where the measuring device is ready to receive data on the same frequency-time resource, it measures and reports the spatial characteristics of the channel commonly known as Channel Estimation. Examples of spatial characteristic parameters include eigenvectors and indices from a codebook that provides the best possible representation of the spatial information of the channel.

The channel parameters 212 may be transmitted by the device measuring the reference signal. In some situations, the channel parameters 132 are forwarded through a device to the base station 102 where the device did not measure the reference signals. For the example of FIG. 2, the channel parameters of the first interference channel may be measured by the transmitting D2D mobile device 202 or the proximate receiving device 107. The channel parameters may by autonomously measured and sent to the base station 102 or may be provided in response to instructions sent by the base station 102.

For the examples herein, the device measuring the channel characteristics is provided information regarding the reference signal to be measured. Examples of information include the communication resources used to transmit the reference signals such as the frequencies and times of transmission (i.e., resource blocks), modulation type, and unique device identification (ID) of the transmitting device used to code the reference signal. An example of a suitable ID is a phone number of the device. The reference signal information (such as the resource blocks) may be dynamic where the reference signal information changes often or may be semi-dynamic where the information regarding the reference signals changes infrequently. The measuring device is provided the reference signal information if and when changes occur. The base station 102 provides the reference signal information using defined cellular communication resources such as a downlink control channel. The information can be provided in the PDCCH, for example.

In one example, the base station 102 provides the proximate receiving device 107 with the reference signal information of the reference signals 214 transmitted by the transmitting D2D mobile device. The proximate receiving device 107 measures the channel characteristics of the first interference channel 208, $H_{1B}$ by measuring the reference signal 216 and transmits channel parameters 212 indicative of the channel characteristics to the base station 102 using the defined cellular uplink communication resources. As discussed above, the channel parameters may be an index from a codebook. In another example, the base station 102 provides the transmitting D2D mobile device 202 with the reference signal information of the reference signals 216 transmitted by the proximate receiving device 106. The transmitting D2D mobile device 202 measures the channel characteristics of the first interference channel 208, $H_{1B}$ by measuring the reference signal 214 and transmits channel parameters 212 indicative of the channel characteristics to the base station 102 using the defined cellular uplink communication resources. As discussed above, the channel characteristics of the D2D transmission channel 206 may also be used to determine pre-coding MIMO parameters 210. As a result, either the transmitting D2D mobile device 202 or the receiving D2D mobile device 204 may transmit the channel parameters indicative of the channel characteristics of the D2D transmission channel 206. Where the receiving D2D mobile device 204 determines the channel parameters, the receiving D2D mobile device 204 measures the reference signal 216 transmitted by the transmitting D2D mobile device 202. Where the transmitting D2D mobile device 202 determines the channel parameters, the transmitting D2D mobile device 202 measures a reference signal 217 transmitted by the receiving D2D mobile device 204.

Figure 3A:
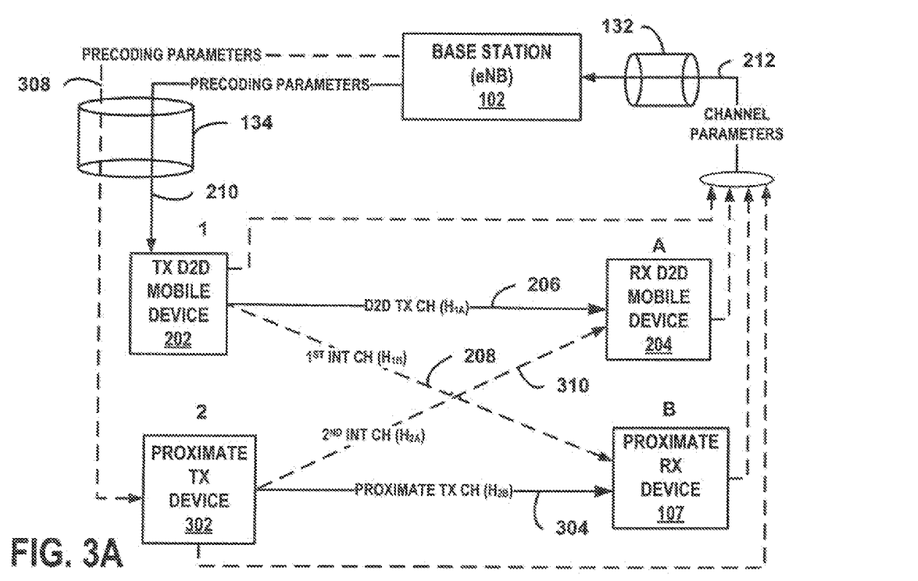
FIG. 3A is a block diagram of an example of the system where a proximate transmitting device transmits signals to the proximate receiving device through a proximate transmission channel ($H_{2B}$).
Figure 3B:
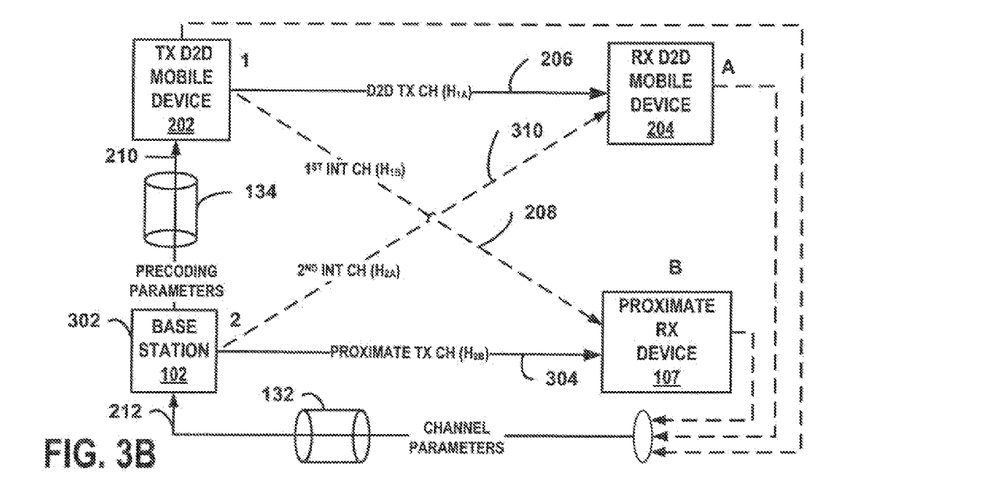
FIG. 3B is a block diagram of an example of the system of FIG. 1A where the proximate transmitting device is the base station 102.

FIG. 3A, FIG. 3B, FIG. 3C and FIG. 3D are block diagrams of examples of the system 100 where a proximate transmitting device 302 transmits signals to the proximate receiving device 107 through a proximate transmission channel ($H_{2B}$) 304. For the examples of FIG. 3A, FIG. 3B, FIG. 3C, and FIG. 3D, therefore, there are two devices (202, 302) transmitting using the same time-frequency communication resources such that the transmitted signals can at least potentially cause interference at the receiving devices. FIG. 3B shows an example of FIG. 3A where the proximate transmitting device 302 is the base station 102. The example of FIG. 3B occurs where cellular downlink communication resources are used for D2D communication.

Figure 3C:
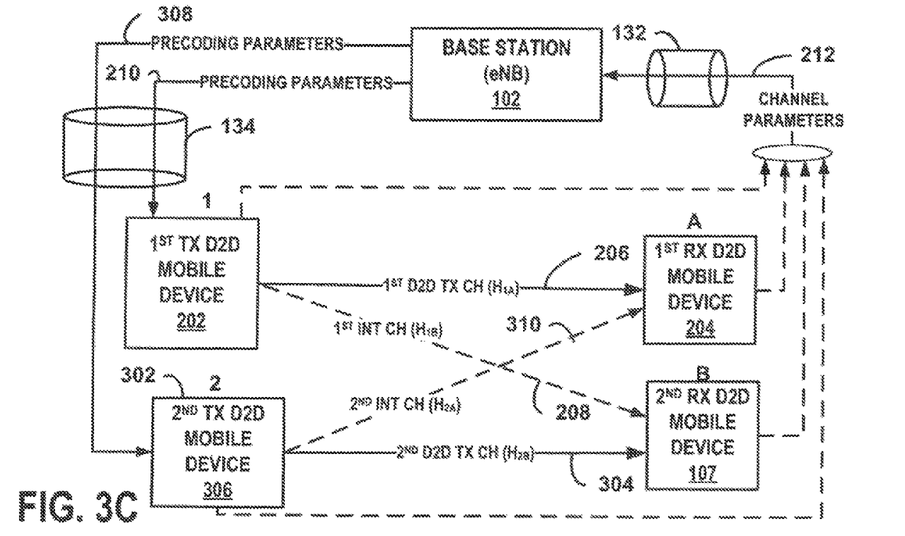
FIG. 3C is a block diagram of an example of the system of FIG. 1A where the proximate transmitting device is a second transmitting D2D mobile device.

FIG. 3C shows an example of FIG. 3A where the proximate transmitting device 302 is a second transmitting D2D mobile device 306. The example of FIG. 3C may occur when cellular downlink communication resources and/or cellular uplink communication resources are used for D2D communication.

Figure 3D:
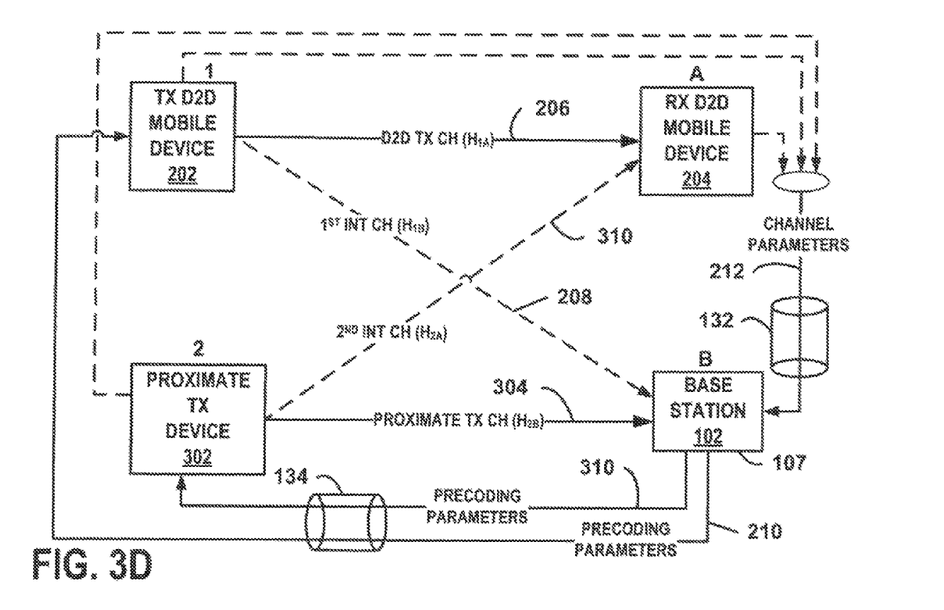
FIG. 3D is a block diagram of an example of the system of FIG. 1A where the proximate receiving device is the base station.

FIG. 3D shows an example of FIG. 1A where the proximate receiving device 107 is the base station 102. In circumstances where the base station 102 is the proximate transmitting device 302, the pre-coding MIMO parameters used by the base station are not transmitted through a cellular wireless channel. The example of FIG. 3D occurs where cellular uplink communication resources are used for D2D communication.

Accordingly, the line representing the pre-coding MIMO parameters is shown as a dashed line in FIG. 3A to indicate that the pre-coding MIMO parameters 308 need not be transmitted to the proximate transmitting device 302 in some circumstances. Interference management is used to mitigate or eliminate the interference at both receiving devices (204, 107). Pre-coding MIMO parameters 210, 308 are provided to the transmitting mobile devices 202, 302 to facilitate interference avoidance, interference containment, interference rejection, and/or interference shaping. The pre-coding MIMO parameters 308 are applied to the transmitted signals from the proximate transmitting device 302 based on at least the channel characteristics of the second interference channel 310 between the proximate transmitting device and the second D2D mobile device 204. The dashed lines representing the channel parameters 212 are shown as dashed lines to indicate that various combinations of measuring and reporting may be employed to provide the base station 102 with the channel parameters required to derive the pre-coding MIMO parameters for the transmitting devices. Although only one direction of communication is illustrated in the figures, the wireless communication devices may change roles. For example, the transmitting D2D mobile device 202 may switch to a D2D receiving device and the D2D receiving mobile device may become a transmitting D2D mobile device. Similarly, the direction of communication between the proximate transmitting device 302 and the proximate receiving device 107 may change.

Interference avoidance includes pre-coding the transmission signals such that interference at an unintended recipient device is avoided. The interference is avoided by pre-coding the transmission signals to be orthogonal and requires little or no interference rejection capability at the receiving devices.

Interference containment includes pre-coding the transmission signals such that an unintended recipient device can sustain the level of interference without a reduction in quality of service (QoS). The interference is avoided by pre-coding the transmission signals such that minimum interference is leaked to unintended recipient devices.

Interference rejection may be performed using antenna beam forming or interference cancellation. Where beam forming is used, the pre-coding MIMO parameters are selected to beam form the transmission from the transmitting device. The receiving device may also apply beam forming to the receiving antennas to cancel the interference. Where interference cancellation is used, the receiver in the unintended recipient device cancels the interference from the receiving signal. The transmission signals are pre-coded such that the receiver can separate the interference and cancels it from the received signal. The interference is decoded then eliminated. The receiving device must have information regarding the transmission signal for interference cancellation. For example, the receiving device may require knowledge of the codebook and modulation used by the transmitting device.

Interference shaping includes shaping the transmission using power control, time or frequency and includes beam forming. With interference shaping, the transmitted does not avoid interference but facilitates receiver based rejection. The distribution of the interference is optimized to minimize the impact. An example of interference shaping includes Interference Alignment (IA). IA can be represented in a vector space representation where all interfering signals are aligned in a selected interference subspace at the unintended recipient device. The interference signals can then be ignored by applying coding that cancels the aligned interference signals in the interference subspace leaving desired signals within the other subspace(s).

The appropriate pre-coding MIMO parameters for the transmitting mobile device and the proximate transmitting device are determined by the controller based on the particular interference management technique employed. The pre-coding MIMO parameters are transmitted to the transmitting D2D mobile device through the defined cellular downlink channel. For the example where the proximate transmitting device is a second transmitting D2D mobile device 306, pro-coding MIMO parameters 308 are also transmitted to the proximate transmitting device using the defined cellular downlink channel. Each transmitting device applies the pre-coding MIMO parameters to transmission signals to manage interference. As discussed above, the transmission signal 124 from the transmitting D2D mobile device is transmitted to the receiving D2D mobile device through the D2D transmission channel 206. The transmission signal also travels through the first interference channel 208 to the proximate receiving device 107. A second transmission signal is transmitted by the proximate transmitting device 302 to the proximate receiving device 107 through the proximate transmission channel 304. The second transmission signal also travels through the second interference channel 310 to the receiving D2D mobile device 204.

Figure 4:
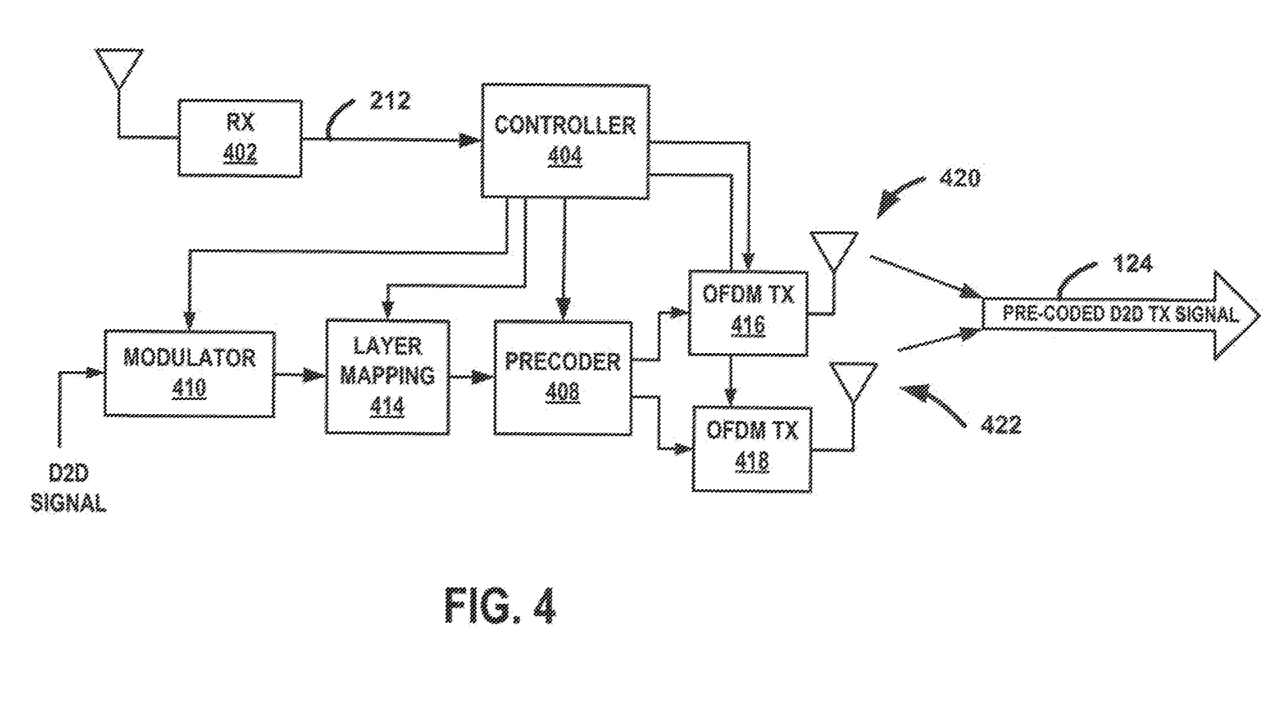
FIG. 4 is a block diagram of an example of wireless communication device suitable for use as a transmitting D2D mobile device.

FIG. 4 is a block diagram of an example of wireless communication device suitable for use as a transmitting D2D mobile device 202. The pre-coding MIMO parameters 212 are received by a receiver 402. Since the pre-coding MIMO parameters 212 are transmitted using defined cellular downlink resources, such as the PDCCH, the receiver 402 is implemented and operates in accordance with conventional LTE systems. The controller 404 and/or receiver 402, however, are capable of extracting the information corresponding to the pre-coding MIMO parameters and, therefore, include additional functionality as compared to conventional systems. The controller 404 controls the transmitter chain 406 to modulate, process, and transmit D2D signals 214. In addition to conventional techniques for transmitting D2D signals, the transmitter also is configured to apply the pre-coding MIMO parameters in the precoder 408. The modulator 410 modulates the D2D signal and layer mapping is applied by the layer mapping function 414. For the example, the precoder 408 is positioned after layer mapping and before the OFDM transmitters 416, 418. The pre-coding MIMO parameters 212, however, may be applied at a different point within the transmitter chain 406 in some circumstances. The precoder applies the pre-coding MIMO parameters to the D2D signal such that the appropriate phase and amplitude are realized at the antennas 420, 422. The pre-coding MIMO parameters 212, therefore, dictate the signal components transmitted through each OFDM transmitter 416, 418 and antenna 420, 422 to form the pre-coded D2D transmission signal 124. The antennas 420, 422 may be discrete antennas or may be antenna elements of single antenna. Further, antennas used for receiving may also be used for transmission in some circumstances. The various functions and operations of the blocks described with reference to the wireless communication device 400 may be implemented in any number of devices, circuits, or elements. Two or more of the functional blocks may be integrated in a single device, and the functions described as performed in any single device may be implemented over several devices. For example, at least some of the functions of the controller 404 may be performed by the precoder 408 and vice versa.

Figure 5:
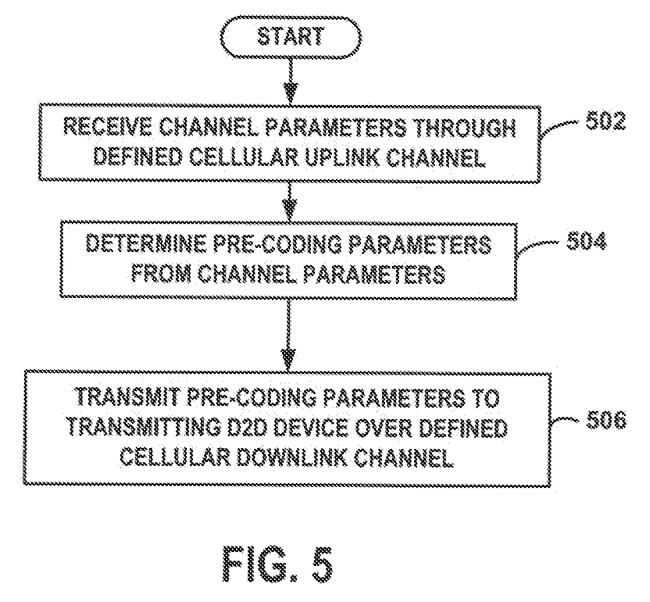
FIG. 5 is a flow chart of an example of method of interference management performed at a communication core network and base station.

FIG. 5 is a flow chart of an example of method of interference management performed at a communication core network and base station. Accordingly, the method may be performed by any combination of the controller 108, scheduler 112, and/or base station 102 in the cellular communication system 100.

At step 502, the channel parameters 212 are received through the defined cellular uplink channel 132 defined by communication specification. An example of a defined cellular uplink channel 132 is the LTE defined PUCCH. As discussed above, the channel parameters are Indicative of the channel characteristics of a channel measured by a wireless communication device by evaluating a reference signal transmitted through the channel. For the example, the interference channel parameters of the interference channel between the transmitting D2D device 202 and the proximate receiving device 107 are determined by the transmitting D2D device 202 by measuring a reference signal 214 transmitted by the proximate receiving device 107. The interference channel parameters may also be determined by the proximate receiving device 107 by measuring the reference signal 216 transmitted by the transmitting D2D device 202.

At step 504, the pre-coding MIMO parameters are determined based on at least the channel parameters. The pre-coding MIMO parameters are selected to facilitate interference management to mitigate or eliminate interference at the proximate receiving device 107 due the D2D transmission signal 124 transmitted from the transmitting D2D mobile device 202.

At step 506, the pre-coding MIMO parameters are transmitted to the transmitting D2D mobile device 202 over the defined cellular downlink channel 134 defined by the communication specification for downlink transmission from base stations to mobile wireless communication devices (UEs). As discussed above, the downlink channel may device specific or a broadcast channel. An example of suitable channel is the LTE defined PDCCH.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A cellular communication system supporting device-to-device (D2D) communication, the system comprising:
   a transmitting D2D mobile device;
   a receiving D2D mobile device wirelessly connected to the transmitting D2D mobile device through a D2D transmission channel;
   a proximate receiving mobile device wirelessly connected to the transmitting D2D mobile device through an interference channel; and
   a base station configured to transmit pre-coding Multiple Input Multiple Output (MIMO) parameters to the transmitting D2D mobile device over a downlink cellular channel defined by a communication specification for downlink transmission, the transmitting D2D mobile device configured to apply the pre-coding MIMO parameters to a D2D transmission signal transmitted from the D2D mobile device, the pre-coding MIMO parameters based on channel parameters indicative of channel characteristics of at least the interface channel and determined to facilitate interference management of interference at the proximate receiving mobile device due to the transmission signal, wherein the proximate receiving device is configured to determine the channel parameters by measuring a reference signal transmitted from the transmitting D2D mobile device and the base station is configured to receive the channel parameters through a defined cellular uplink channel defined by the communication specification for uplink communication from mobile wireless devices to base stations from the proximate receiving device.

2. The system of claim 1, wherein the channel parameters comprise:

D2D channel parameters indicative of D2D transmission channel characteristics of a D2D transmission channel between the transmitting D2D device and the receiving D2D device; and interference channel characteristics indicative of the interference channel, the base station configured to receive the D2D channel parameters from the receiving D2D mobile device and to receive the interference channel characteristics from the proximate receiving mobile device.

3. The system of claim 1, wherein the interference management is one of interference rejection, interference shaping, interference avoidance, and interference containment.

4. The system of claim 1, wherein the interference management comprises Interference Alignment (IA).

5. The system of claim 1, wherein the defined downlink control channel is a Physical Downlink Control Channel (PDCCH).

6. The system of claim 1, wherein the defined downlink control channel is a Physical Downlink Shared Channel (PDSCH).

7. The system of claim 1, wherein the defined downlink control channel is a broadcast channel.

8. The system of claim 1, wherein the base station comprises the proximate receiving device.

9. A cellular communication system supporting device-to-device (D2D) communication, the system comprising:

a transmitting D2D mobile device;

a receiving D2D mobile device wirelessly connected to the transmitting D2D mobile device through a D2D transmission channel;

a proximate receiving mobile device wirelessly connected to the transmitting D2D mobile device through an interference channel; and a base station configured to transmit pre-coding Multiple Input Multiple Output (MIMO) parameters to the transmitting D2D mobile device over a downlink cellular channel defined by a communication specification for downlink transmission, the transmitting D2D mobile device configured to apply the pre-coding MIMO parameters to a D2D transmission signal transmitted from the D2D mobile device, the pre-coding MIMO parameters based on channel parameters indicative of channel characteristics of at least the interface channel and determined to facilitate interference management of interference at the proximate receiving mobile device due to the transmission signal; and a proximate transmitting device wirelessly connected to the proximate receiving mobile device through a proximate transmission channel and wirelessly connected to the receiving D2D mobile device through a second interference channel, the base station further configured to transmit other pre-coding MIMO parameters to the proximate transmitting device, the other pre-coding MIMO parameters based on other channel parameters indicative of channel characteristics of at least the second interface channel and determined to facilitate interference management of interference at the receiving D2D mobile device due to the another transmission signal transmitted from the proximate transmitting device.

10. The system of claim 9, wherein the base station is configured to transmit the other pre-coding MIMO parameters over the cellular downlink communication channel.

11. The system of claim 9, wherein the base station is configured to receive the other channel parameters from the receiving D2D mobile device.

12. The system of claim 9 wherein the base station is configured to receive the other channel parameters through a defined cellular uplink channel defined by the communication specification for uplink communication from mobile wireless devices to base stations.

13. A wireless communication device comprising:

a receiver configured to receive pre-coding Multiple Input Multiple Output (MIMO) parameters from a cellular base station over a cellular downlink communication channel defined by a communication specification for downlink transmission between base stations and wireless communication devices; and a transmitter configured to apply the pre-coding MIMO parameters to a device-to-device (D2D) transmission signal transmitted to a receiving D2D mobile device, the pre-coding MIMO parameters based on channel parameters indicative of channel characteristics of at least an interface channel between the wireless communication device and a proximate receiving device, pre-coding MIMO parameters facilitating interference management of interference at the proximate receiving mobile device due to the D2D transmission signal, wherein the receiver is further configured to receive a reference signal transmitted by the proximate receiving device to measure the channel characteristics and wherein the transmitter is configured to transmit the channel parameters to the base station.

14. The device of claim 13, wherein the interference management is one of interference rejection, interference shaping, interference avoidance, and interference containment.

15. The device of claim 13, wherein the interference management comprises Interference Alignment (IA).

* * * * *